US009813779B2

(12) United States Patent
Deo et al.

(10) Patent No.: US 9,813,779 B2
(45) Date of Patent: Nov. 7, 2017

(54) METHOD AND APPARATUS FOR INCREASING USER ENGAGEMENT WITH VIDEO ADVERTISEMENTS AND CONTENT BY SUMMARIZATION

(71) Applicant: 24/7 Customer, Inc., Campbell, CA (US)

(72) Inventors: Shekhar Kumar Deo, Santa Clara, CA (US); Manoj Rajshekar, Fremont, CA (US); Gaurav Kumar, Palo Alto, CA (US)

(73) Assignee: 24/7 CUSTOMER, INC., Campbell, CA (US)

( * ) Notice: Subject to any disclaimer, the term of this patent is extended or adjusted under 35 U.S.C. 154(b) by 0 days.

(21) Appl. No.: 15/385,608

(22) Filed: Dec. 20, 2016

(65) Prior Publication Data
US 2017/0105051 A1    Apr. 13, 2017

Related U.S. Application Data

(63) Continuation of application No. 14/096,569, filed on Dec. 4, 2013, now Pat. No. 9,554,184.

(60) Provisional application No. 61/733,247, filed on Dec. 4, 2012.

(51) Int. Cl.
| | | |
|---|---|---|
| *H04N 7/173* | (2011.01) |
| *H04N 21/81* | (2011.01) |
| *H04N 21/442* | (2011.01) |
| *H04N 21/458* | (2011.01) |
| *H04N 21/234* | (2011.01) |
| *H04N 21/258* | (2011.01) |
| *H04N 21/44* | (2011.01) |
| *H04N 21/439* | (2011.01) |
| *H04N 21/466* | (2011.01) |

(52) U.S. Cl.
CPC ..... *H04N 21/812* (2013.01); *H04N 21/23424* (2013.01); *H04N 21/25883* (2013.01); *H04N 21/4394* (2013.01); *H04N 21/44008* (2013.01); *H04N 21/44222* (2013.01); *H04N 21/458* (2013.01); *H04N 21/4667* (2013.01)

(58) Field of Classification Search
CPC ....... H04N 21/44213; H04N 21/23424; H04N 21/25883; H04N 21/458; H04N 21/812; H04N 21/4788; H04N 21/8456
See application file for complete search history.

(56) References Cited

U.S. PATENT DOCUMENTS

| | | |
|---|---|---|
| 6,219,837 B1 | 4/2001 | Yeo et al. |
| 2003/0061610 A1 | 3/2003 | Errico |
| 2007/0300269 A1 | 12/2007 | Roberts et al. |
| 2009/0007202 A1 | 1/2009 | Williams et al. |

*Primary Examiner* — Yassin Alata
(74) *Attorney, Agent, or Firm* — Perkins Coie LLP

(57) ABSTRACT

Embodiments of the invention provide techniques for increasing user engagement with video ads and content. The invention is not limited to video advertisements, but is applicable to any other content. Embodiments of the invention provide engagement formats that use interesting frames in a video or objects within video frames to increase user engagement in the video, one or more frames of the video, or any object within the video.

20 Claims, 13 Drawing Sheets

METHOD AND APPARATUS FOR INCREASING USER ENGAGEMENT WITH VIDEO ADVERTISEMENTS AND CONTENT BY SUMMARIZATION

CROSS REFERENCE TO RELATED APPLICATIONS

This application is a continuation of U.S. patent application Ser. No. 14/096,569, filed Dec. 4, 2013, which claims priority to U.S. provisional patent application No. 61/733,247, filed Dec. 4, 2012, which application is incorporated herein in its entirety by this reference thereto.

BACKGROUND OF THE INVENTION

Technical Field

The invention relates to video advertising. In particular, the invention relates to enhancing video advertising with engaging and interactive content.

Description of the Background Art

Video content is becoming increasingly popular on all display platforms. As a result, a large volume of video content is made available for viewing every day. Such video content ranges from product advertisements to entertainment videos. The upward Internet speed trend in the mobile domain and the world wide Web provides sufficient bandwidth to keep pace with the growth of video content, thus enabling accessibility of such video content on a variety of display devices easily and without disruption.

Online video advertising is also becoming increasingly popular due to the availability of mobile telephones, tablets, IP TVs, and other custom and proprietary devices. However, the traditional approach used in advertising over television does not provide users with the ability to interact with the advertisements. Such ability is embedded in currently available smart devices that show video content. Therefore, video advertisements can be more interactive due to the nature of these devices. However, not many video advertisements are presently interactive, except where they may provide a redirect link to a marketing landing page.

Consumer behavior is also different in the traditional TV and smart device market segments. In the smart device market segment, consumers are very time sensitive and tend to ignore the video advertisements by skipping or by switching to another device webpage, application, or channel whenever they encounter a long video ad. Typical video ads are long, i.e. 30 seconds. On an average, for every five minutes of video content displayed, content providers show 30 seconds of advertisements. So, 10% of user time is consumed in watching ads, and it gets worse when the same lengthy video ads are repeated multiple times. Not only does this frustrate the user, it also creates a negative impact on the brand and/or product that is being advertised.

As a solution, some the content providers provide the capability to skip ads if the user is not interested. In most cases, when a user skips ads, advertisers lose the opportunity to engage the users, while content providers waste the resources that are needed to display video ads that are skipped. Therefore, there is an incumbent need to engage users with the ads and content without making the ads a boring and to-be-avoided aspect of any online session.

SUMMARY OF THE INVENTION

Embodiments of the invention provide techniques for increasing user engagement with video ads and content. The invention is not limited to video advertisements, but is applicable to any other content. Embodiments of the invention provide engagement formats that use interesting frames in a video or objects within video frames to increase user engagement in the video, one or more frames of the video, or any object within the video.

DETAILED DESCRIPTION OF THE INVENTION

Figure 1:
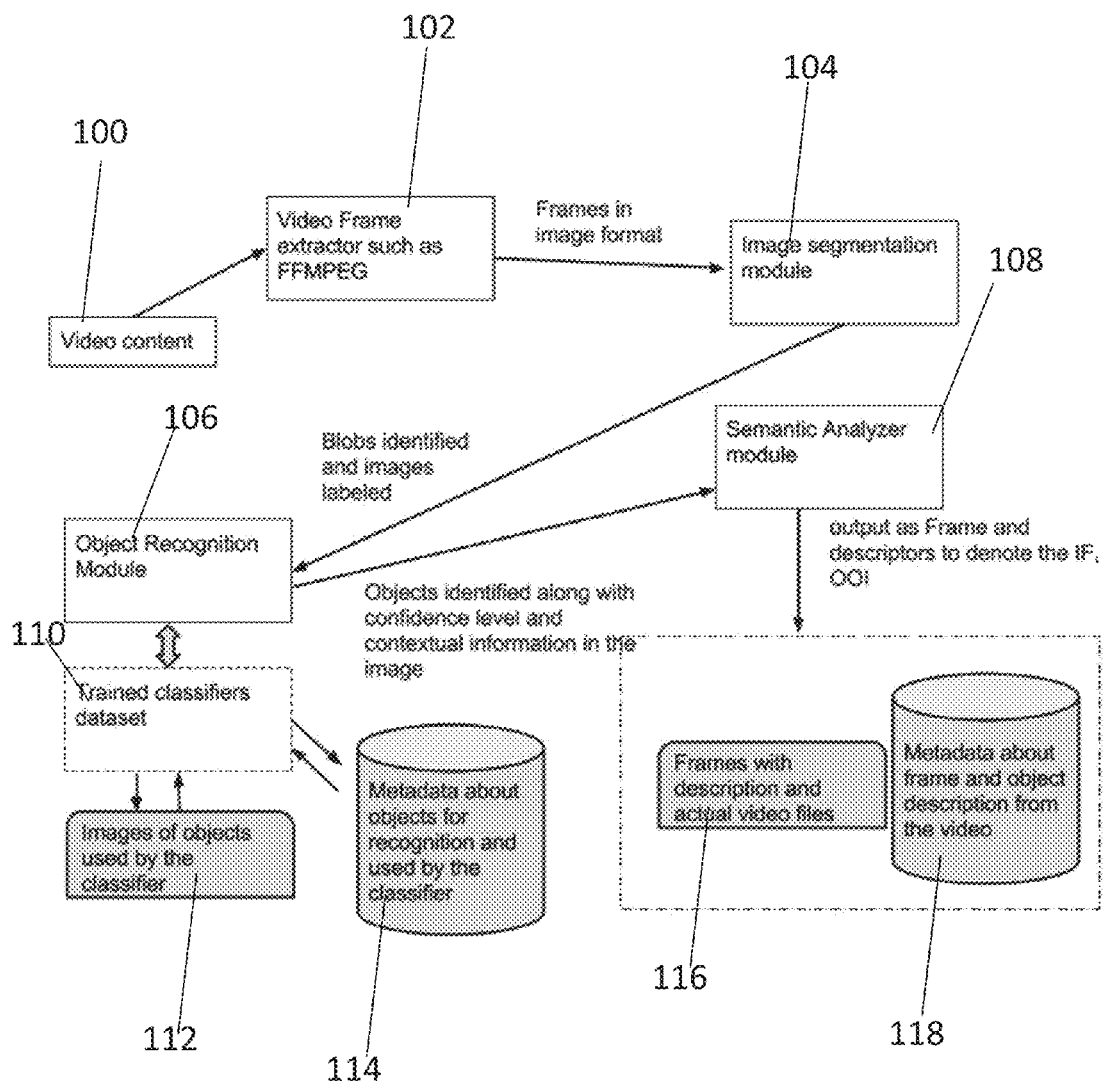
FIG. 1 is a block schematic diagram that shows how a video is parsed and key frames identified, along with objects of interest, in all the underlying frames according to the invention.

Embodiments of the invention provide techniques for increasing user engagement with video ads and content. The invention is not limited to video advertisements, but is applicable to any other content. Embodiments of the invention provide engagement formats that use interesting frames in a video or objects within video frames to increase user engagement in the video, one or more frames of the video, or any object within the video.

Embodiments of the engagement system disclosed herein can be readily understood by analogy to a book reading and engagement process. A book has a content table that helps the reader to know the contents in the book and that raises the reader's interest in continuing to read the book. In embodiments of the invention, interesting frames of a video are provided to the user to raise enough interest in the user that the user watches the video. The book reader reads a chapter of the book and then the reader may try to recollect the previous reading better by reading a summary of the chapter. In embodiments of the invention, the interesting frames of the video act as a summary of the video.

In embodiments of the invention, the full length video are divided into something similar to a book's chapters. The interesting frames of the video can be thought of as chapters that act as smaller length, i.e. broken parts, summary of the video. Once the book reading is done, the best way to judge the knowledge of the reader is to take a test. By analogy, embodiments of the invention use a validation component to judge the knowledge and understanding of users regarding the advertisements and content that they have viewed. Embodiments of the invention also encompasses similar features as presented to a book reader while going through a book, such as bookmarking, highlighting, marking comments, commenting, revising, taking tests, cross-referring, and generating additional notes.

DEFINITIONS

The terms below, as used herein, shall have the meaning associated therewith:

Engagement units—Engagement units are the extra features of the video and content or advertisements that increase the chances of user involvement. Engagement units increase user interaction with the video and content, thus leading to purchase, registration, awareness, recommendation, social sharing, lead generation, or any other marketing, sales, and business objectives of the products or/and services.

IP TV—Internet protocol based televisions. These are also called connected televisions.

Ads/Ad—Ads are advertisements. In this document, where ads are mentioned, this term refers to any content that could be used to increase the business, sales, and marketing of products or/and services.

Video—Video is a combination of several images played continuously at a certain rate. In this document, video refers to digital video advertisements, digital video content, digital video marketing or sales material, or any other type of content that can be streamed or played, e.g. as a sequence of connected frames. Video also refers to one or more content presentations.

OCR—Optical character recognition.

IF—Interesting frames. Interesting frames are the most interesting frames from among the various frames of the video. The interesting frames can be a static set of frames or they can be different for different target audiences who watch the video.

OOI—Objects of interest. An OOI is an object or a part of image within one frame or image of the video that is interesting. The interesting object could be static or it can be different for different target audiences.

DISCUSSION

Embodiments of the invention comprise various components that interact with each other to create, place, validate, and measure engagement units. There are various other components that also provide support to enhance user engagement.

The following lists components and function of the overall engagement system, as discussed in greater detail below:
Create engagement units;
Place engagement units;
Validate user engagement with the engagement units;
Measure user engagement;
Analyze user engagement measurements;
Optimize retargeting of advertising;
Make interesting frames more social;
Convert video ads and content dynamically to provide game-like user interaction;
Create templates for presenting interesting frames;
Automate the overall engagement process;
Manual moderation to create and update user engagement with video and content;
Validation engagement;
Audio analysis and engagement;
Engagement format creation;
Fast forward a video and at the end of session provisioning to run the complete video if requested by the user;
Include audio and static images between videos to cater to different demographics; and
Include hand-written static images between videos in the validation format.

Creating Engagement Units

Engagement creation aims at creating engagement units for content presentations, e.g. videos. These engagement units are meant to increase the engagement of a user watching video ads. The engagement can be any sort of activity performed by the user, such as viewing, clicking, swiping, touching, dragging, etc.

Embodiments of the invention engage the user by bringing informative and interesting frames out of the video ads. The videos could be provided in any suitable format, such as mov, fly, mp4, or avi. In embodiments of the invention, extraction of frames from the video ads is accomplished by the user of readily available tools, such as FFMPEG, which is a free software project that produces libraries and programs for handling multimedia data. FFmpeg includes libavcodec, an audio/video codec library used by several other projects, libavformat, an audio/video container mux and demux library, and the ffmpeg command line program for transcoding multimedia files. FFmpeg is published under the GNU Lesser General Public License 2.1+ or GNU General Public License 2+(depending on which options are enabled).

Each video is prepared at a specific frame rate, which is the number of frames per second. Tools such as FFMPEG allow extraction of such frames which can be considered as a sequence of images that constitute the video. For extraction, parameters, such as frame rate, format of the image, and specific resolution of the image, are specified. In the current case, the resolution is similar to the base video. Once extracted, the images are either stored as jpeg format files or cached in memory for further processing and identification of informative frames.

In some embodiments of the invention, the most informative frames are those frames that have more text in them. This is just an example. The definition of interesting frames varies based on many criteria. In some cases, the interesting frames can be the ones that contain the least amount of text. Other criteria can be the selection of frames that have the least common factors. This brings diversity in frames. Sometimes the interesting frames can be a combination of frames selected by various criteria.

System Architecture

FIG. 1 is a block schematic diagram that shows how a video is parsed and key frames identified, along with objects of interest, in all the underlying frames according to the invention. FIG. 1 shows the key modules involved in the process and how the resultant IFs (interesting frames), along with objects of interest (OOI), are identified.

Video content 100 is received at a video frame extractor 102. Extracted frames in a specified image format are provided to an image segmentation module 104 which identifies blobs and label extracted images. This information is provided to an object recognition module 106, which applies a trained classifiers dataset 110 that is built from images of objects used by the classifier 112 and metadata about objects for recognition and that is used by the classifier 114. Objects that have been identified, along with information regarding a confidence level and contextual information in the image are provided to a semantic analyzer module 108. The output of the semantic analyzer module contains frames and descriptors to denote interesting frames and OOI, which are saved as frames with descriptions and actual video files 116 and metadata about frames and object descriptions from associated videos 118.

The interesting frame selection logic is adaptive in nature and thus improves itself based on the feedback provided to the system. For one video ad, there could be multiple types of selection logic, such as selecting the frames that contains only text, selecting the frames that contains images and text, selecting the frames that contains only logos, and selecting the frames that contain logos and text. Once the video ad is run through several users, the user interaction with the frames determines which selection logic works better. The higher the user interaction with certain frames, the better is the selection logic for the frames in that video. Such learning is stored for the type of video ad. Aggregated knowledge helps to provide logic for performing intelligent selection for future frame selection of a similar type of video ad.

Embodiments of the invention also try to bring some order or priority in terms of interest. This can be a dynamic process that is based on the demography, geography, or contents of the video, where interesting frames are presented for engagement. In embodiments of the invention, interesting frames are defined as the most interesting elements of the content presentation. The interesting frames can be different for different target audiences. The interest of a target user defines the criteria that is used to select the interesting frames of the video. For example, if the video is about a travel story, interesting frames for a target audience consisting of teenage males could be those which show bikes and cars. However, for a target audience consisting of teenage females, the interesting frames could be those which show scenic places, cruises, and parties. Extraction of interesting frames depends on several criteria, such as the type of video, e.g. text centric, animated, people centric, etc.; category of video, e.g. food, building, etc.; target audience; publisher; etc.

Interesting frames can have multiple attributes to fulfill the marketing objective of the video, e.g. redirection links to corporate, social, or ecommerce websites, particular landing page, media articles, etc. Interesting frames also contain tools to help users share content presentations or portions thereof within their social network. Such tools also allow users to capture their comments. An analytics engine then gathers all these comments and consolidates them for use by, for example, an advertiser. The consolidation process categorizes the user comments in broader categories based on the demography and geography. One simple example of such categorized comments is:

x % users "loved" your "frame y" in "California" who were "males" in the age range of "20-30," and y % users "recommended to friends" your "frame z" in "New York" who were "females" in the age range of "20-30."

Once the key frames are extracted, it is very important to extract meaning out of those frames to generate automated interactivity. Embodiments of the invention apply scene understanding of the frames where scenes can be converted to text. The key components of the scene understanding task are the image segmentation module, the object recognition module, and the semantic analyzer. The image segmentation module takes the image in formats such as jpeg or png format, identifies different connected components or blobs in the image, and labels them such that all pixels in the same blob get the same number. The labeled image is then passed to the object recognition module for recognition of the different blobs. The recognition module extracts each blob and passes it through an ensemble of trained classifiers for specific objects. Each object based classifier returns a confidence level that that blob is the specific object. A threshold can be applied to the confidence level to get the final object. The identified objects are then passed to a semantic analyzer module that takes contextual information of the objects and generates a frame description based on their relative location in the image. Predefined mappings between the objects, such as bicycle-ride, jacket-wear, are used to produce a meaningful frame description.

For example, a frame description may be: "A person riding a bicycle wearing a brown jacket." This description can be improved by incorporating Natural Language Processing (NLP) to annotate the text for the machine to understand. Methods such as named entity recognition can be used to generate annotated blocks of text. For instance, the above scene can be annotated as:
"<Noun>Person</Noun><Color>Brown</Color><Apparel>Jacket</Apparel>."

Such annotations can be used to create automated interactivity questions, such as:

"Type the color of the jacket the person is wearing."
Or:
"Click on the person wearing a brown jacket".

A sub-branch of NLP, i.e. machine translation, can be used to provide multi-lingual support for the interactivity creation, where the interactivity question can be automatically translated and served based on the demography of the engagement shown.

In some embodiments of the invention, user engagement and/or interaction can be made more interesting and engaging by including audio content of the ads. The audio content can include rich information about the ads. The audio content can be translated to text using existing speech-to-text engines, and the converted text can then be used to extract frames, for example where a brand name or a product name was spoken. Other embodiments of the invention include, for example, spotting keywords in the entire audio and showing them in corresponding frames.

Placing Engagement Units

The content owner who wishes to place video ads into content can customize the placement of the engagement units. Embodiments of the invention provide default templates that can be used to place interesting frames in a way that can engage users. Based on the availability of space and the accessing device, the templates can be different.

The style and appearance of interesting frames within the template can also be customized. One style of template rotates frames under the video ad that is being played. An example of a custom appearance of the frames involves size and border color of the frames. For the appearance of interesting frames, the frames can be placed in an incremental order of time. For example, one frame appears in the first second of the ad, next frame appears in the third second, the next frame appears in the fifth second, and so on. Other embodiments of the invention have interesting frames appearing together, for example, after five seconds, with additional frames appearing after ten seconds, and the rest of the frames appearing after 15 seconds.

The objective of placing several different interesting frames can be different. One objective of placing interesting frames is summarizing the video ads. Another objective allows the user to interact with various interesting advertising messages, and another objective spreads user redirection towards various marketing places, such as corporate sites, mobile micro-site, Facebook page, twitter page, YouTube pages, etc. In some embodiments of the invention, these objectives can be combined to form a better placement.

Key Frame Extraction

Figure 2:
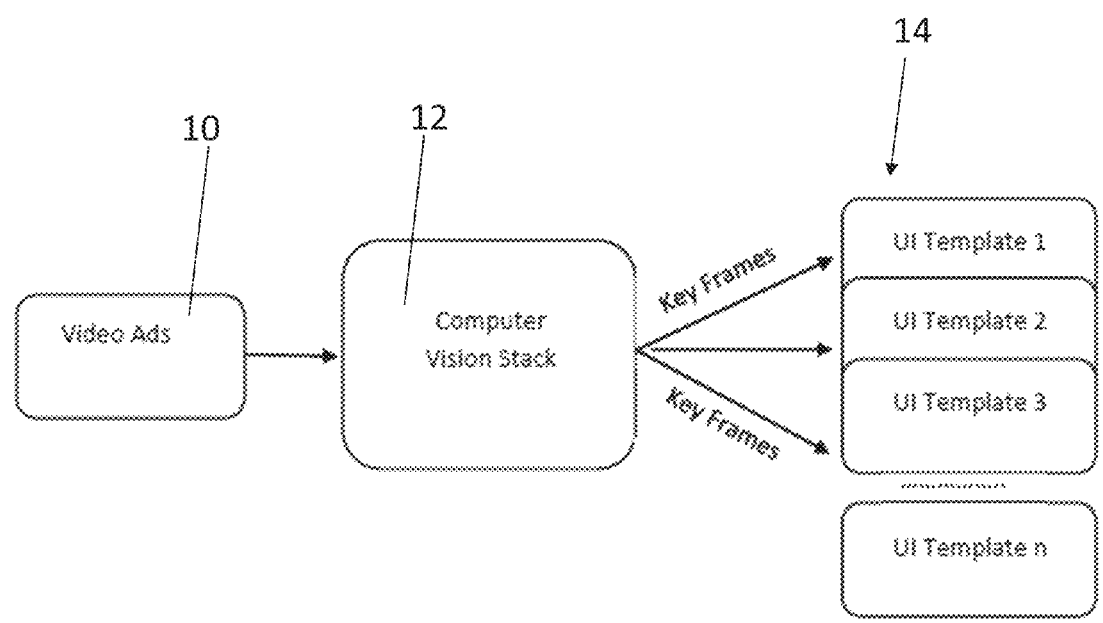
FIG. 2 is a block schematic diagram showing a technique for key frame extraction according to the invention.

FIG. 2 is a block schematic diagram showing a technique for key frame extraction according to the invention. One way to generate interesting frames or frames of interest is to pass the video ads 10 through a computer vision stack 12 that parses the video ads in an efficient and intelligent way to extract frames 14 that contain more textual or visual information. In an embodiment of the invention, the computer vision stack includes a mechanism that clusters frames based on visual descriptive features, where the key frames are the frames that are closest to the cluster centers. Common clustering algorithms can be applied on the visual descriptive features to achieve such clustering. However, the clustering algorithms are modified to include various criteria for clustering the images that are more relevant to the objective, e.g. clustering only food related frames, clustering only the frames that contains texts, and clustering the frames that contain a logo of the brand of interest.

Another embodiment of the invention runs frames at a regular interval to a text extraction algorithm and includes frames with a higher estimate of text. In embodiments of the invention, text is extracted from the frames by analyzing strokes for each pixel in the image both horizontally and vertically. The strokes in text have certain uniform behavior, such as uniform width at each pixel. Heuristics are applied to group pixels with same stroke width, such as regions having same stroke width and within some minimum distance, which could be part of same word, and so on. A union of both visual and textual frames can be shown as the most descriptive and interesting frames of the video. These frames can be shown as static banners or could be bundled into a form of fast forward video ad.

Even more advanced systems can use tracking of text or visual words. Tracking of text provides short videos of varying length, derived from original ads, and highlighting regions where the most significant messages are displayed or conveyed to the customer. Tracking visual words helps in a similar manner in branding and highlighting popular products that are included in the ads.

Validating User Engagement on the Engagement Units

Figure 3:
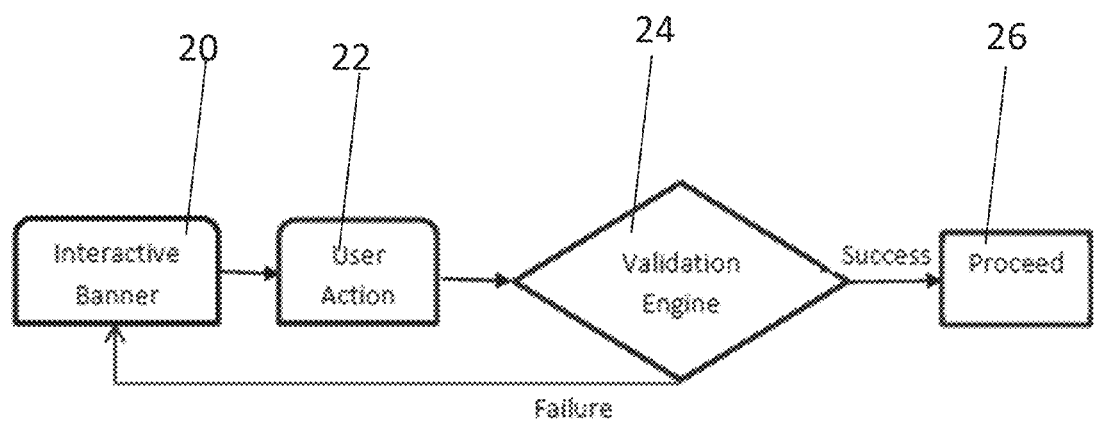
FIG. 3 is a block schematic diagram showing validation of user interaction according to the invention.

Embodiments of the invention add user interactivity to the interesting frames and validate user interaction. FIG. 3 is a block schematic diagram showing validation of user interaction according to the invention. In FIG. 3, an interactive banner 20 is added to an ad. User action 22 is identified and a validation engine 24 confirms that the user action is an expected or valid action. If so, then the action is validated and the system proceeds 26; if not, then the action fails.

Interactivity can occur through any of several ways, such as by detecting and carving objects of interest (OOI) from images; image tag creation, where tags are created around the interesting part of the image; and text tagging, where text tags are created for the interesting part of the images, all to create interactivity.

Interactivity serves at least two purposes:

1. Creation and placement of interactivity: Based on the template, interactivity is created for an interesting frame. An interactivity unit is placed in the ad for user interaction. The interaction style can dynamically change based on the devices accessing the ad and the capability of the devices. A frame with interactivity is placed differently. It measures the session of the user and then, based on the user's previous interactions, places a newly created interactive frame with which the user can interact.

2. Validation of interactions: User interaction is validated to determine whether the user interacted with the ad in an expected or requested manner. The validation interaction can provide major information on whether the user interacted successfully or failed to interact. Statistical models of user interactions, such as behavioral, demographic, and geographic data models provide knowledge about target audience.

Embodiments of the invention also analyze the data pattern to isolate human and non-human traffic. In embodiments of the invention, such analysis is performed by learning behavioral patterns based upon user interactions, such as mouse hover and mouse-clicks. Based on the device capabilities, especially devices that support haptics, patterns of user interaction behavior are also considered. On current smart devices which support haptic technology, the interaction feedback from users identifies where the user swipes on the screen, what angle the user tilts the screen, how long the vibrator on the phone operated, how much motion was detected on the tablet when the user was consuming the content, and all other tactile haptic feedback as supported by the devices.

Such embodiments of the invention rely on the hypothesis that more often than not, the human behavior in terms of mouse-hover and clicks follow certain distinct patterns and for non-humans there is certain random behavior that may not follow any pattern. Embodiments of the invention involve learning separate models for humans and non-humans by collecting sequences of such interactivity data from a group of users.

Embodiments of the invention also use data patterns to categorize different types of users, e.g. users who spend more time, users who are more active in visiting some websites, and users who do not interact with advertising. Data patterns are also used to understand the psychological, emotional, and other soft behaviors of users. The data patterns collected for different users are passed to a machine learning (ML) stack. The ML stack represents the behavioral data as a combination of fractions of different possible behaviors. The underlying assumption is that each action performed by the user has certain contributions from multiple hidden states that represent the individual's state of mind.

Embodiments of the invention use independent surveys, experiments, and studies of human interactions as base information. Embodiments of the invention use different learning models that apply machine-learning algorithms to strengthen this information and thereby detect different types of users, either in real-time and/or offline. Thus, the validation element of the invention provides interaction details, for example, to a caller to take further action, refresh the interactivity, provide another interactivity, or do any other thing.

Measuring User Engagement

Embodiments of the invention measure user engagements, i.e. user interaction, with the interesting frames. There are various interactions that are important to capture such as hover, click, drag, etc. The measurement of such engagements can be captured in association with the engagement unit and the user session to uniquely differentiate the engagements. Measurements of such engagements can also be different for different templates where interesting frames can be placed in different style and formats.

Embodiments of the invention maintain a specific session for each video served. Every interaction of the user during the session is captured and sent to the server for logging. Embodiments of the invention use parsers to extract different events, such as mouse clicks, drag, hover, etc., and store the timing and frequency of such events. Embodiments of the invention also measure the fraction of overall interactivity present in the video ad with which the user successfully interacted. The success of the events could also be measured in terms of completion of the individual events, such as whether the interaction was completed fully or partially. In such case, the x and y co-ordinates returned by the logger are used to calculate completion of interaction.

Analyzing User Engagement Measurements

In embodiments of the invention, an engagement measurement analysis component (EMAC) receives engagement measurements as an input and then provides various insights about user engagement with the video. The EMAC receives these engagement measurements and parses them to extract information, such as time at which the engagement happened, which portion of the ad the engagement happened, what was the engagement, and so on. The EMAC also receives the origin of the request to fetch the ad. Such data is passed to a lookup service to fetch demographic and geographic information, such as the latitude, longitude, city, country, region, etc. Sometimes the request for the ad may also contain gender information as well.

These insights can be accumulated in different ways, such as based on demography, geography, gender, etc. and then fed to an engagement creation and placement module (ECPM) to provide feedback. In embodiments of the invention, a learning model is built into the system that captures the feedback to improve various targeting analytics applied and thus do a better job in determining the target audience and devices.

The learning model uses the measurements provided by the EMAC, and also uses the demographic, geographic, and gender insights, to understand which engagements were successful or were interacted with by people from which demography or gender. The input to the model is these measurements in form of a vector, along with the demographic and geographic details obtained by the lookup service of EMAC, and gender details obtained from the request parameter. The output is the success or failure in terms of the interactions of the engagements.

The analytic engine also uses enhanced user engagement data to understand the behavioral aspect of the video ads. In such case, a second level of the learning model is added to ECPM which takes the same set of input as above and learns the behavioral aspect of the user.

Optimizing Retargeting Advertising

Embodiments of the invention use statistical data generated by user interactions to optimize retarget advertising. Retarget advertising occurs where an advertisement is showed again to users who have previously interacted with the advertisement. Embodiments of the invention use cookies and user session information provided by the ECPM to optimize such retargeting. Because different formats allow users to interact in various ways, embodiments of the invention generate optimized retargeting audience information, such as for users who showed real interest to know about the ad, users who showed a good intent to know more about the ad, users who interacted deeply with ad and can be potential retarget audience, and users who did not see or interact the ad. The feedback provided by ECPM is used for above. Embodiments of the invention integrate such retargeting information to other data intermediary services provided by other external systems to strengthen the information. The retargeting information can be used internally to target audience for advertising conversion. Such retargeting information is also sent to other digital retargeting advertising partners who can use this information to target the audience in other advertising inventories.

The implementation of this component is done by matching the data from retargeting data, e.g. obtained independently or by partners, and user engagement data. This component reads the request from the client to deliver the ad and tries to match the request data to user engagement data for the similar previous requests. It picks the user engagement for the ads that closely matches the user request. For example, if the same ad is delivered to user five times with different engagement units in it, but the user engaged with two type of engagement units, then those engagement units are delivered more often to users who have a similar profile. Nearest neighbor finding algorithms are used for this, based on some of the datasets received from the client requests, such as IP address, operating system, browser, time of the day, day of the weak, and device information. The nearest neighbor algorithm uses such data and user engagement data to select the engagement units for the ad that has higher probability of user engagement with the ad.

Making Interesting Frames More Social

Interesting key frames can be associated with capabilities to spread over the social networks. Some of the social networks that can be included are Facebook, Twitter, LinkedIn, Pinterest, Flicker, and YouTube. These capabilities help a user to find interesting moments in the video to share with his social connections in the aforementioned networks. Embodiments of the invention track such activity in the social networks associated with each frame. Such interactions in the social networks with each associated frame can be collected and analyzed. Embodiments of the invention show a social interaction timeline of the video ads. In such case, the interesting key frames of the video ads are marked with consolidated metrics from user interactions in social networks, such as: "Likes—500,000", "LinkedIn share—500,000", "Tweets—500,000", etc. This information can also be combined with other engagement data metrics.

Social features on video ads can also be embedded into full video advertisements. This enables the user to capture an interesting frame and then share it across several social networks. In such case, a user can select a combination of one or more interesting frames of the video and one or multiple user captured frames from the video.

Figure 4A:
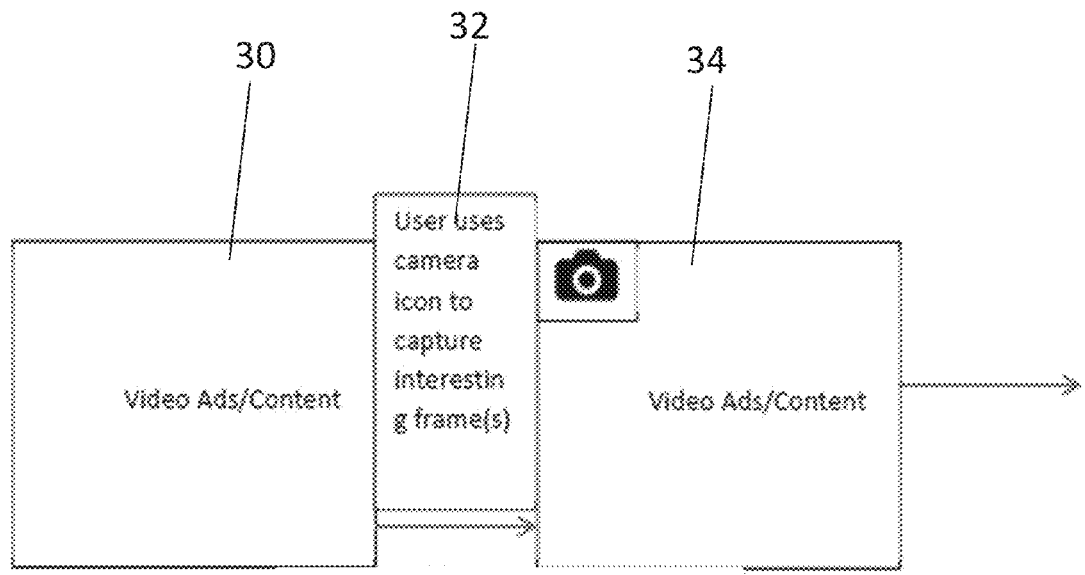
FIG. 4A is a flow diagram showing the capture of interesting frames according to the invention.
Figure 4B:
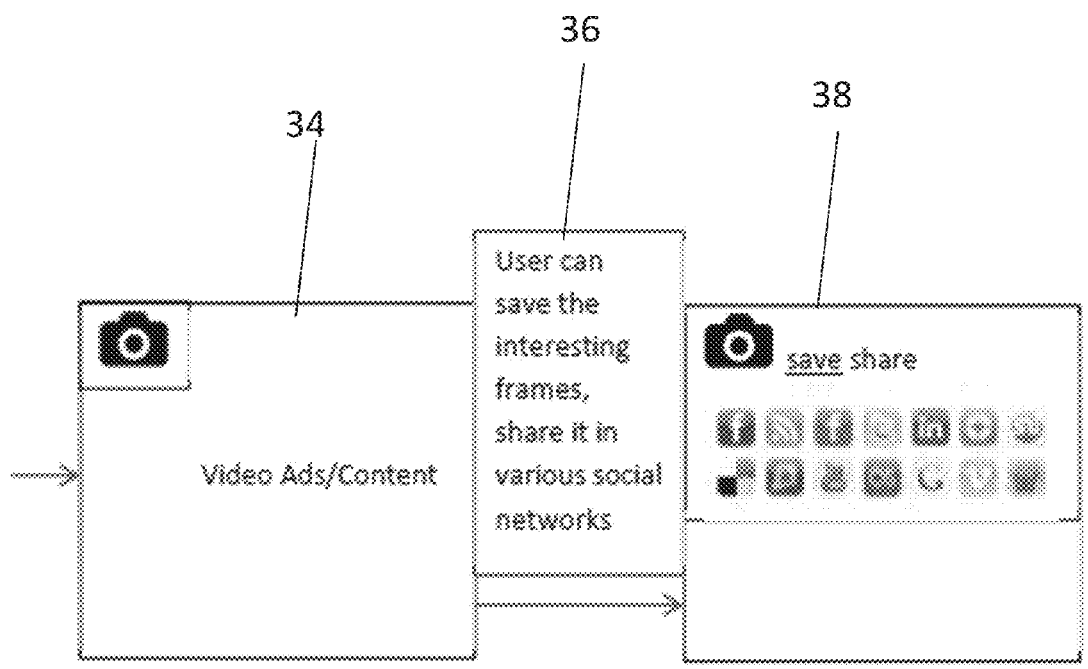
FIG. 4B is a flow diagram showing the sharing and saving of interesting frames according to the invention.

FIG. 4A is a flow diagram showing the capture of interesting frames according to the invention; FIG. 4B is a flow diagram showing the sharing and saving of interesting frames according to the invention; and FIG. 4C is a flow diagram showing the social tagging of interesting frames according to the invention.

In FIG. 4A, video ads and content 30 are provided to a user who uses a camera icon in the ad and/or content 32 to capture interesting frames 34.

In FIG. 4B, the interesting frames 34 can be saved by the user 36 to share in any of various social networks, for example using a 'save share' button 38.

Figure 4C:
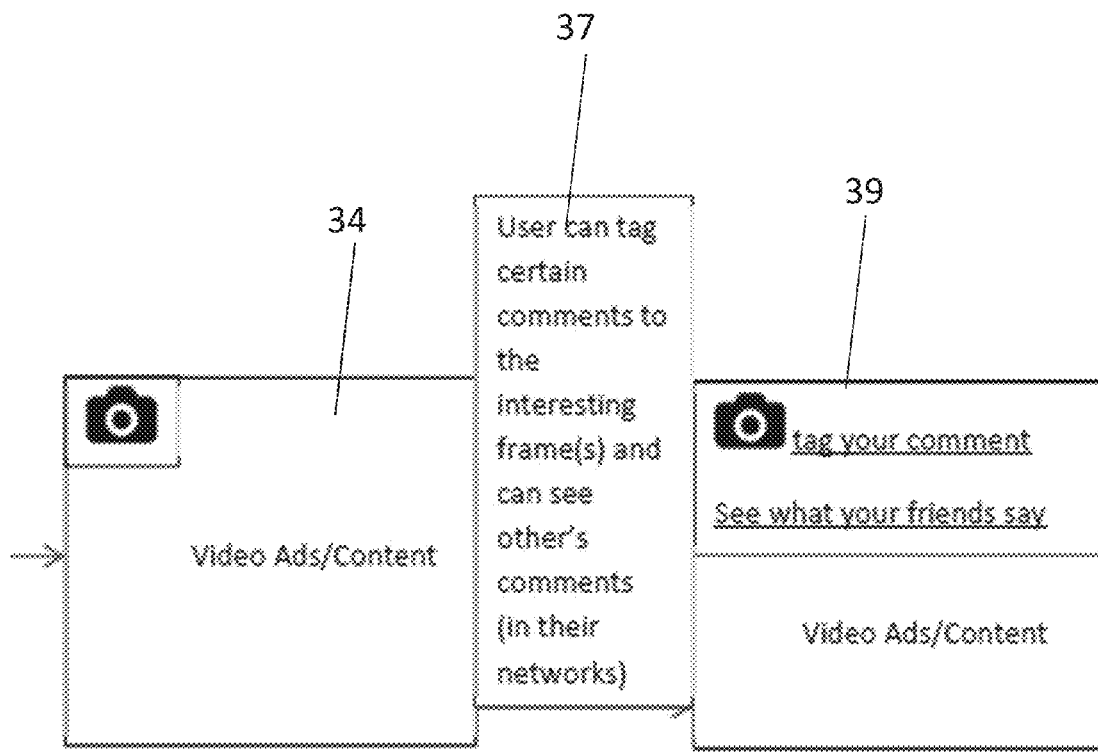
FIG. 4C is a flow diagram showing the social tagging of interesting frames according to the invention.

In FIG. 4C, the interesting frames 34 can be tagged 37 to include comments. These tags can be viewed by others and the user can view tags that others have added to the interesting frames. A 'tag your comment, see what your friends say' tool 39 is provided for this purpose.

Dynamically Converting Video Ads and Content to Provide Game-Like User Interaction Embodiments of the invention allow a user to do certain interactions with the video that provide some value back to the user or to some other users and/or organizations. For example, a user captures three out of five of the most validated frames of the video and wins a coupon. In this case, the interaction is to capture frames that look more interesting, the validation is to compare the user selected frames with the most validated frames, and the value back to the user is the coupon.

User interaction capability is added dynamically to the video ads based on the target audience. This helps the advertiser capture better interaction data from the target audience. The different engagement units, such as the interactivity unit, validation unit, and the value unit, are dynamically selected to match the target audience. Embodiments of the invention create templates for presenting interesting frames. The interesting frames can be bundled for different templates.

In embodiments of the invention, several templates are built to present interesting frames. In addition to the templates discussed above, the following is a non-exhaustive list that provides further examples of templates:

Fast Forward template: This template takes the interesting frames and provides them as skimmed and summarized video advertisements that consume less time.

Frames template: This template holds interesting frames around the video ads to show more impact of the interesting frames while the video ad is in progress.

Filmstrip template: This template holds all interesting frames in less space and appears in a translucent manner. This is helpful when ads are being seen in full screen. When the user focus goes to the particular frame, there is a zoom out of the image for better visibility.

Overlay frames: This template is used to put one of the multiple interesting frames on top of the video. This is helpful in the event the video stream is paused, stopped, waiting, etc.

Validation template: This template is used to hold interesting frames with all other interactivity associated with the template. The user is asked to interact with a certain part of the frame to complete the ad. This also validates that a human is doing the interaction.

Automating the Overall Engagement Process

Figure 5:
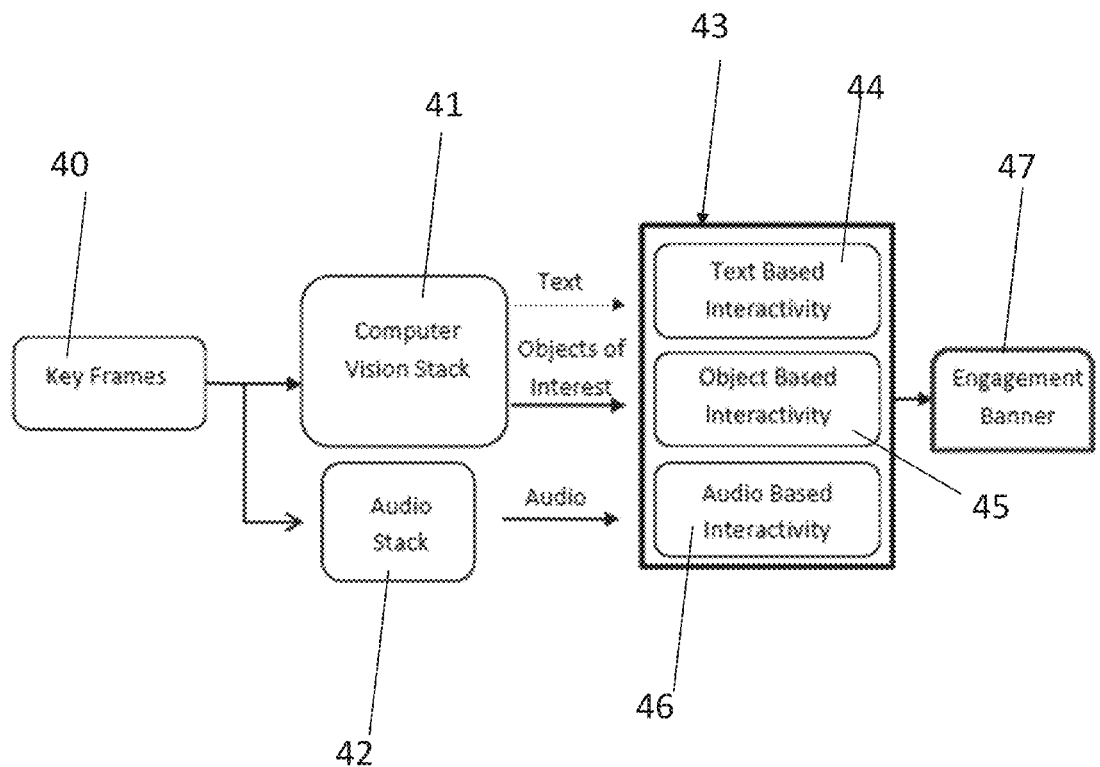
FIG. 5 is a flow diagram showing automatic engagement creation according to the invention.

FIG. 5 is a flow diagram showing automatic engagement creation according to the invention. This aspect of the invention forms a queue for incoming video/content ads and then uses other methods, such as OOI and frame of interest (FI) to bring out interesting frames and the interesting objects in the corresponding frames of the video. It also automates the engagement creation process in which the OOI and the corresponding frames are layered together over the ad in various ways to increase user engagement.

As shown in FIG. 5, the regions across the key frames 40 are used to extract text and OOI from the video via a computer vision stack 41 and to extract rich audio content from the video via an audio stack 42. Interactivity is generated from this. As discussed, two different stacks are used for visual and audio information extraction. The visual stack extracts text and OOI from the key frames, which are then passed to an interactivity generator 43 that includes a module 44 that generates text-based interactions based on the text and a module 45 that generates object-based interactivity based on the OOI.

For OOI extraction, the computer vision stack 41 takes the key frame 40 as input and segments the image into the individual connected components or objects that are present in the key frame. The first step in image segmentation is pixel based clustering. The pixel based clustering takes the color components in terms of Red, Green and Blue (RGB) value for each pixel of the image, along with its x, y co-ordinates, and clusters this data into individual groups. The outputs of this step are groups of pixels having similar texture and temporal location. The clusters are further passed to a stack that merges groups of pixels that are nearby and possibly of same object. For example, an object containing a person wearing a jersey might have multiple clusters one of jersey and another of skin, possibly the face and the hand of a person. The objects extracted from this step are considered as OOI. The embodiments of the invention also include the different object classifiers that have trained models for individual objects. The OOI is passed to individual models to identify the objects. Automated interactivities are generated based on the OOI extracted such as "Hover on the IPAD to see latest offers.", where the IPAD is the OOI.

The audio stack extracts the audio content from the region across the key frames and provides audio to the interactivity generator, in which a module 46 is provided for determining audio-based interactivity. In embodiments of the invention, interactivity is generated from audio by spotting brand names or other important keywords such as "Discount" and "Off," to name a few. The list could also include launched product names.

In speech, each keyword is considered as a sequence of phonemes and different words are formed by a different sequence of multiple phonemes. The audio stack takes the audio portion of the video and keywords represented as sequence of phonemes and returns the regions of the audio that have a same or similar sequence of phonemes. The audio based interactivity generator maintains a mapping between keywords and interactions, such as the word "Discount" could be mapped to "Rollover for details" and a rollover interaction could be displayed when the word "Discount" is spotted in the audio stream. The embodiments of the invention also use the audio content to validate the OCR output of the extracted text or validation of the OOI classification. As a result, an engagement banner 47 is generated.

Manual Moderation to Create and Update User Engagement with Video and Content

Embodiments of the invention provide an interface to moderate the task of video and/or content engagement creation and any updates that may be required. Embodiments of the invention provide help to improve the engagement layer, and to add other interesting frames by manual selection of the frames from the video and/or content, or by automatic selection of the frames using such criteria as, for example, time intervals, frame rate, etc. Embodiments of the invention also provide the capability to delete some frames that were selected by the automatic process.

The embodiments of the invention identify the right audio to go with the edited video and/or content. The relevant audio could be that in which the brand of interest is mentioned in the ad, or a section of the ad where the message of the ad is more evident. In some cases, certain portions of right background music could also be chosen.

The audio component of this method translates the video speech into text. The audio stack first separates the audio into vocal and non-vocal regions. The vocal regions are those where some human speech is present with or without some background music, while non-vocal regions are those where only background music or other non-human sounds are present. A binary classifier is applied on features extracted from the frequency domain to separate vocal and non-vocal sequences. The vocal sequences are passed to a speech-to-text module that takes vocal regions as input and outputs the corresponding text. This translation is helpful for editing sound effects in the original version of the video to form an edited version. The translated speech can be selected—in a continuous or fragmented form to select the corresponding audio elements from the video. The method also offers the provision to select audio elements by marking directly on the audio part of the video, selecting time intervals of first few seconds or last few seconds or other options such as these.

Validation Engagement

Figure 6:
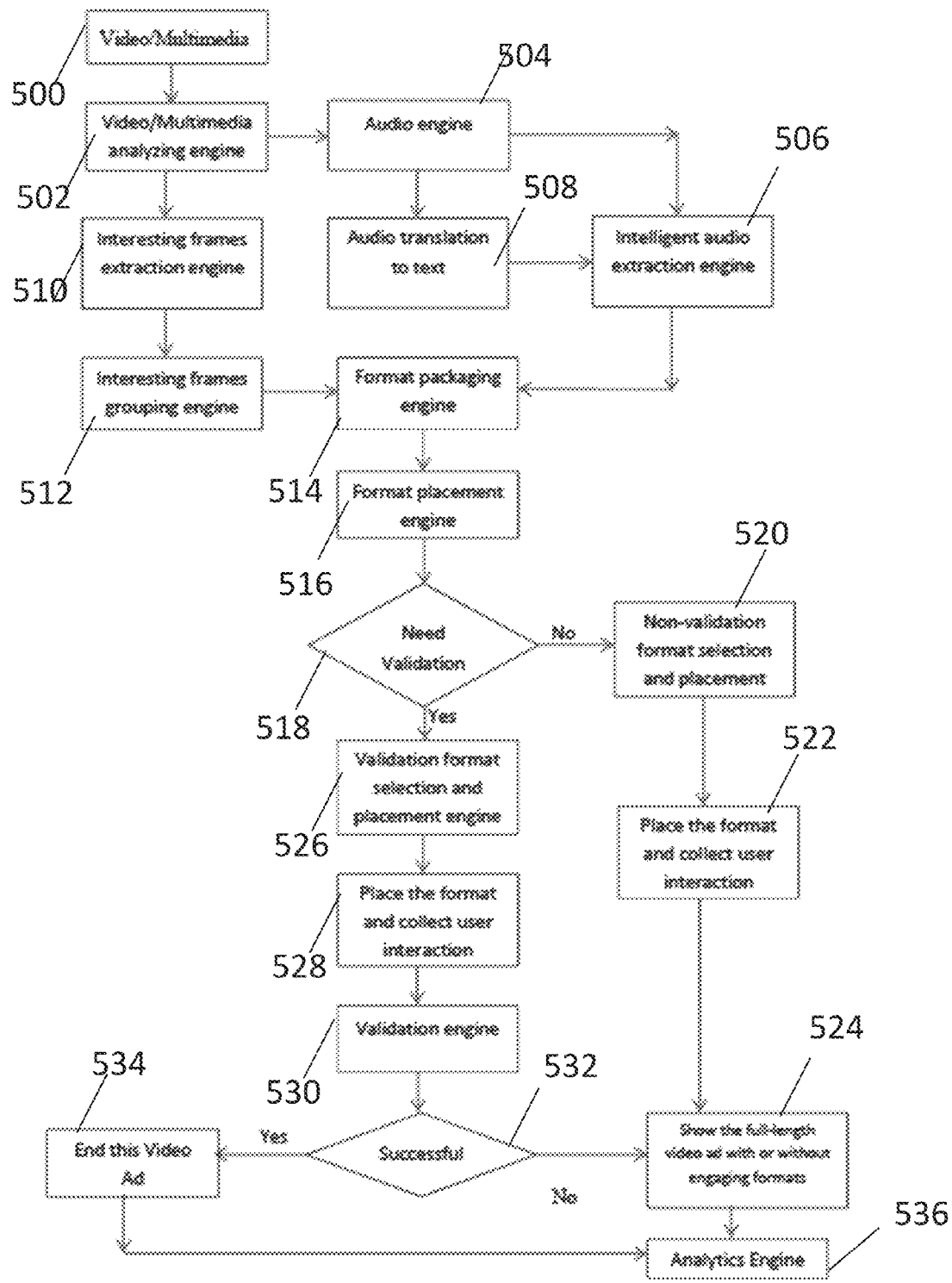
FIG. 6 is a flow diagram showing system operation according to the invention.

FIG. 6 is a flow diagram showing system operation according to the invention. In FIG. 6, video and/or content (500) is provided to a video/content analyzing engine (502).

An audio engine (504) extracts audio with an intelligent audio extraction engine (506). Audio translation to text may also be performed (508). The audio information is then provided to a format packaging engine (514).

The video/content analyzing engine (502) also provides information to an extraction engine that identifies interesting frames (510), which are then grouped by a grouping engine (512). The frame information is then provided to a format packaging engine (514).

The format packaging engine provides frame and/or audio information to a format placement engine (516) and a determination is made whether or not validation is necessary (518).

If validation not necessary, then non-validation format selection and placement is performed (520) and the format is placed and user information is collected (522). The full length video is then shown with or without engaging formats (524) and the results are provided to an analytics engine (536).

If validation is necessary, then a validation selection and placement engine is employed (526) and the format is placed and user interaction information is collected (528). The validation engine (530) then determines if the engagement was successful (532).

If engagement was successful, then the video for the ad is ended (534) and the results are provided to the analytics engine (536).

If engagement was not successful, then the full length video is shown with or without engaging formats (524) and the results are provided to the analytics engine (536).

In such system, when video ads are served to the user over the Web, the user has the option of not watching the full-length ad, for example the user is asked to solve a challenge and/or quiz to let the advertiser know that the user has already received the ad. When a user visits a website, he creates a session. The first time that a video ad is served within a session, the full-length of the video ad is shown to the user. The next time that the same video ad is served to the user, there can be an option to quickly move out of the ad by solving a simple quiz and/or challenge without watching the full-length video. If the response from the user for the challenge and/or quiz is not correct, the full-length video can start or a shorter version of the video, for example in fast forward format, can be used. If the response from the user is correct, then the user can go out of the ad as soon as the response is validated. The challenge and/or quiz presented to the user, for which the user provided a valid response in an earlier session, may not be shown to the user again. Next time, within the same session, another challenge and/or quiz can be shown to the user.

These quizzes and/or challenges are created automatically by using interesting frames. Prominent objects are detected automatically or moderated by individuals in the interesting frames. The challenge and/or quiz question is created around those prominent objects. For example, if an interesting frame has five car models, the challenge could be "when are these car models launched?", or "Click on the car which is going to be launched in March 2013," or the user can be asked to click on the smaller version of the object in the bigger interesting frames.

There could be multiple ways to ask the user to interact and respond to the questions. The user interactions can be targeted to the right devices. For example, tablets and smartphone devices can use touch, swipe, tilt, etc. for responding to the challenge. An analytics engine creates (or can create) very rich metrics based on the user engagement with such validation ads. These metrics can demonstrate the number of users who received the advertising message successfully. They could also validate if the users are able to understand the advertising message clearly or not. The user engagement metrics with such interesting frames can provide demographic, geographic, gender, etc. related information that can help advertisers to understand the customer needs better and help them create better advertising for such target users.

The user engagement data, such as response to certain product related questions or a survey; or the user interactions, such as touch, swipe, or tilt, are passed to an analytic engine which stores the response for every session. Such responses are mapped to the demographic and other information provided by the EMAC module discussed above.

Further, validation frames can complement video ads or be a standalone ad that is presented to the user who already has seen the video ad, for example based on the session history log of the user. Such ads can also be used in other workflow in the website.

Audio Analysis, Summarization, and Engagement

The audio part of the video or a standalone audio ad is sent to the audio engine FIG. 6). The audio engine tries to analyze the audio by doing several activities, such as translating the audio to text, sending the text to brand classifier to detect if a known brand is being talked about, finding a spot zone which contains prominent message of the video and fitting the ad into the time expected (total time of the short video), or finding a default zone that is good enough (last part of audio ads) for associating the audio component to the summarized video. The audio engine uses machine learning algorithms to detect brands from a learned classifier and parses the audio to spot places where the brand is being called out. It also has the capability to analyze audio elements without translating it to text. The audio engine also provides a manual interface where a human can moderate the selection of the right audio zone to tailor the audio to fit the requirement.

Engagement Format Creation

Embodiments of the invention create and enhance user engagement in the video or content objects in different formats. In embodiment of the invention, such formats are classified into two broad categories:
1. Validation needing formats; and
2. Non-validation formats.

The formats which require validation are those in which users are presented with a challenge, quiz, and/or puzzle and only the interaction responses from the users are validated. Based on the response results, different actions can be associated with the format. For example, if the response validation is successful, the user is allowed to see the media content without showing the full-length ads. If the response validation fails, the user is served another challenge associated with the same ad or any other ad for which the user has already seen the video ad. The user also sees the correct answers before moving to the other challenge. If a user fails multiple times and the total engagement time is more than the time taken by the full-length video ads, the user is allowed to end the ad and move to the content.

Figure 7A:
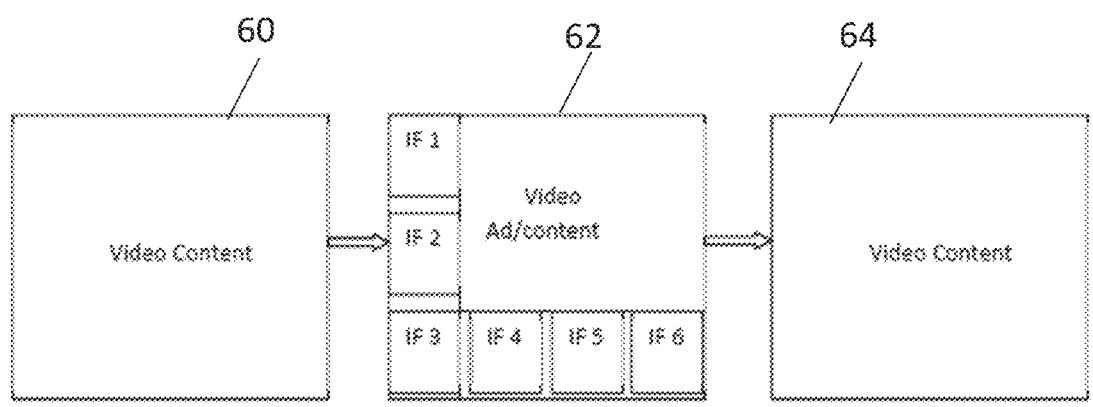
FIG. 7A is a flow diagram showing format 1: filmstrips according to the invention.
Figure 7B:
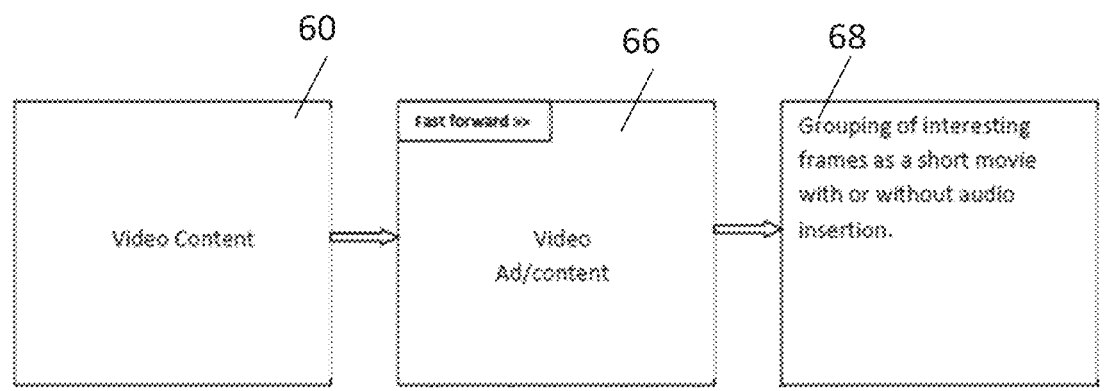
FIG. 7B is a flow diagram showing format 2: fast forward format according to the invention.

FIG. 7A is a flow diagram showing format 1: filmstrips according to the invention; FIG. 7B is a flow diagram showing format 2: fast forward format according to the invention; and FIG. 7C is a flow diagram showing format 3: validation format according to the invention.

In FIG. 7A, video content 60 is processed to identify one or more interesting frames 62, and the processed video content 64 is then provided to the user.

In FIG. 7B, video content 60 is processed to apply a fast forward feature (discussed above and below) 66, and a grouping of interesting frames is then provided as a short movie 68, with or without audio insertion, to the user.

Figure 7C:
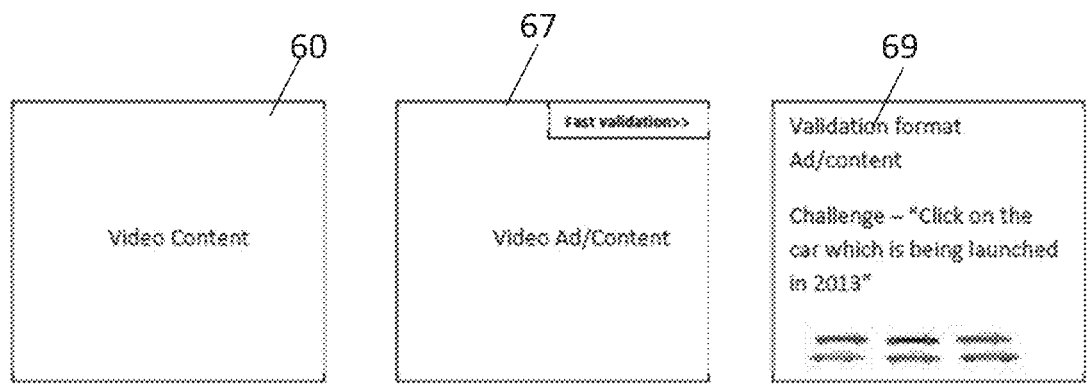
FIG. 7C is a flow diagram showing format 3: validation format according to the invention.

In FIG. 7C, video content 60 is processed for fast validation (discussed above) 67, and the processed video content 69 is provided to the user in a validation format that, in FIG. 6C, provided the user with a challenge, i.e. 'click on the car which is being launched in 2013.'

Figure 8:
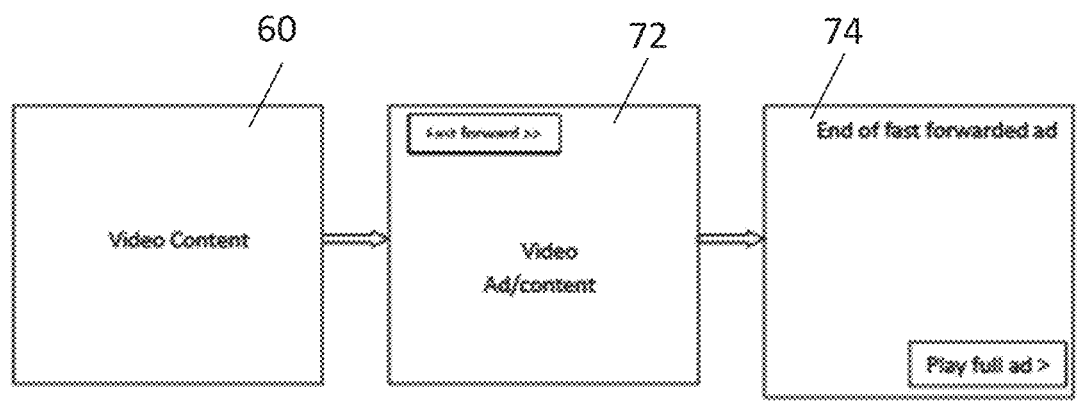
FIG. 8 is a flow diagram showing a fast forward and provision to play a full ad according to the invention.

Fast Forwarding a Video and, at the End of the Session, Provisioning to Run the Complete Video if Requested by the User FIG. 8 is a flow diagram showing a fast forward and provision to play a full ad according to the invention. Video content 60 is summarized, as discussed above. The summarized video contains a provision to keep a related audio ad. This could be part of audio element of the full-length video. While the complete ad is being shown, the user is presented with an option of fast forwarding the ad 72. At the end of playing the fast forwarded ad, there is a provision to play the full ad, if the user so desires 74. The fast forward and provision to play a full ad could be cyclic and the number of cycles could be controlled either by the advertiser, the publisher of the video, or the user.

The position of the options to "fast forward" or "play full ad" is configurable by the video content provider or the content publisher. Embodiments of the invention include audio and static images between videos to cater to different demographics Audio content and static image content, such as advertising or regular content, are varying and could be demographic dependent. For example, a Coke audio ad in U.S. might be different from something shown in Spain. It would be the same ad when shown with static images. When the video is being summarized, additional content in terms of audio and/or image files is embedded to construct either a summarized version of the ad or a demographic suitable ad. This additional content is part of a repository which includes additional metadata to define the with which ads the metadata is to be associated. For example, an advertiser would have a repository of audio files in various languages pertaining to a brand. Similarly, there would static banner images in various languages. When the frames in the video are extracted and understood, based on language detected, the audio for the correct language and the image related to the respective language and content combination is embedded into the summarized video or into the newly constructed video. For example, a soda brand has a video ad and several audio ads. When the video is being summarized, the content in the video is identified for language detection and the correct audio is used for summarization, e.g. the ad would play English in the U.S. and in Spanish in Spain.

Including Hand-Written Static Images Between Videos in the Validation Format

In the validation format discussed above, if the intent is to use the video for proof of human interaction and, thus, to prevent spam bots from automatically hitting the fast-forward, then frames are provided between the video where the user has to interact to continue playing the video. Other similar human interaction is embedded which requires humans, but which is difficult for programs and bots to do. The frames have interactivity defined in terms of questions and answers. The questions are in handwritten format images and these handwritten images are in different languages, based on the demography where the video is shown. There is a generic language also if no specific demographic targeting is needed. When the video is extracted frame-wise, and new images are inserted in the summarized part, the new images are constructed using the hand written images. The hand written images form the challenge text.

Computer Implementation

Figure 9:
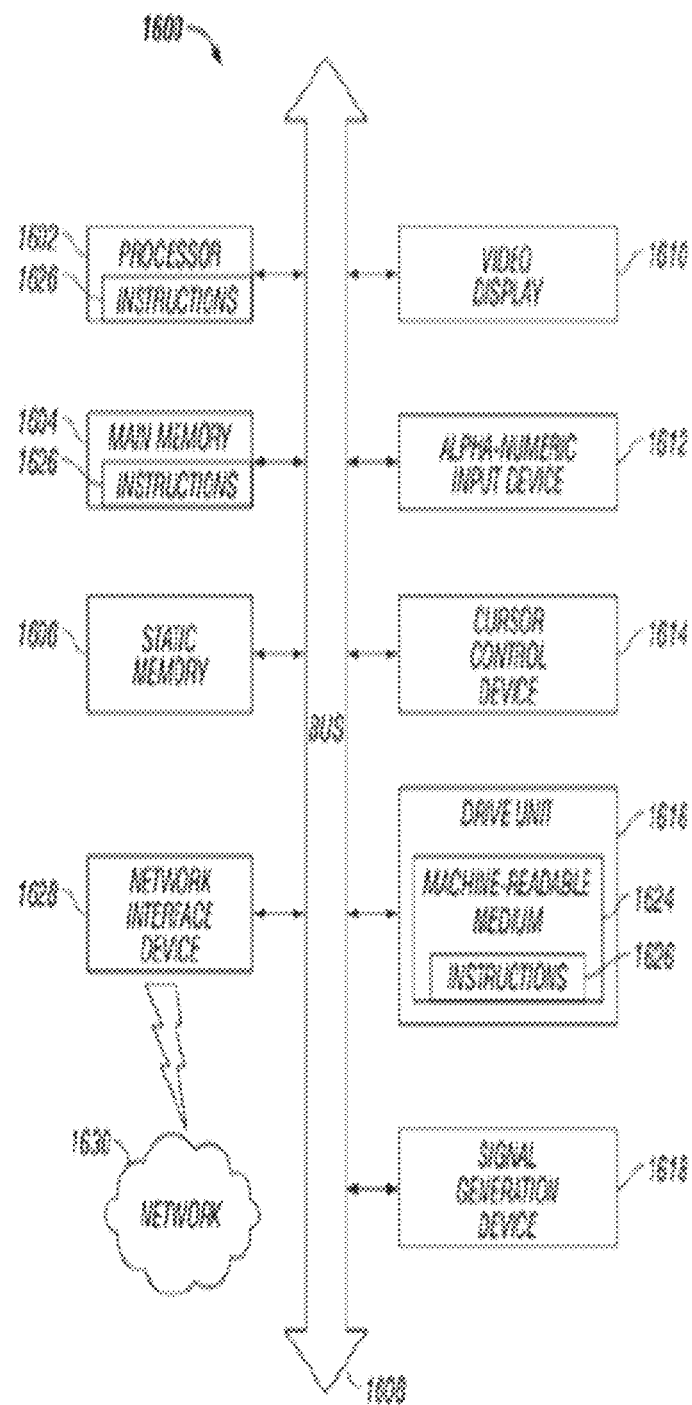
FIG. 9 is a block schematic diagram that shows a machine in the exemplary form of a computer system within which a set of instructions for causing the machine to perform any of the herein disclosed methodologies may be executed.

FIG. 9 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant, a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC). Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, the embodiments disclosed herein can be implemented through at least one software program running on at least one hardware device and performing network management functions to control the network elements.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A system for increasing user engagement with video advertisements and content by summarization, comprising:
   one or more processors; and
   memory storing instructions, wherein the one or more processors are configured to execute the instructions such that the one or more processors and the memory are configured to implement:
   a video analyzing engine receiving a video presentation;
   an intelligent audio extraction engine extracting audio from said video presentation;
   a format packaging engine receiving audio information from said intelligent audio extraction engine;
   an extraction engine receiving information from said video analyzing engine and identifying interesting frames;
   a grouping engine for grouping said interesting frames;
   said format packaging engine receiving said grouped interesting frames information from said grouping engine;
   a format placement engine receiving any of frame and audio information from said format packaging engine, said format placement engine determining when validation is necessary:
   when validation is not necessary, non-validation format selection and placement is performed, the format is placed into a playback of a full length video, user information is collected from a viewer of the full length video, wherein the full length video is shown to the viewer with or without engaging formats, and results are provided to an analytics engine; and
   when validation is necessary, the format is placed into the playback of the full length video, user interaction information is collected, and a validation engine determines when the engagement is successful;
   when engagement is successful, video for an ad is ended and results are provided to said analytics engine; and
   when engagement is not successful, the full length video is shown with or without engaging formats and results are provided to said analytics engine.

2. The system of claim 1, wherein said interesting frames are identified based on one or more objects represented in said interesting frames.

3. The system of claim 2, wherein said objects are identified based on audience demographics of said full length video.

4. The system of claim 2, wherein said engaging formats include one or more of a challenge, a quiz, or a puzzle.

5. The system of claim 4, wherein said one or more of said challenge, said quiz, and said puzzle include interactivity corresponding to said one or more objects represented in said interesting frames.

6. The system of claim 1, wherein said results provided to said analytics engine are used to retarget advertising.

7. The system of claim 1, wherein the one or more processors and the memory are further configured to implement:
   performing audio translation of the extracted audio to text, wherein said interesting frames are identified based on said text from said audio translation.

8. A computer-implemented method for increasing user engagement with video advertisements and content by summarization, comprising:
   receiving a video presentation;
   extracting audio information from said video presentation;
   identifying interesting frames of said video presentation;
   grouping said interesting frames;
   determining, by a processor, when validation is necessary using any of frame and audio information:
   when validation is not necessary, non-validation format selection and placement is performed, the format is placed into a playback of a full length video, user information is collected from a viewer of the full length video, wherein the full length video is shown to the viewer with or without engaging formats, and results are generated; and
   when validation is necessary, the format is placed into the playback of the full length video, user interaction information is collected, and determining when the engagement is successful;
   when engagement is successful, video for an ad is ended and results are provided for analysis; and
   when engagement is not successful, the full length video is shown with or without engaging formats and results are provided for analysis.

9. The computer-implemented method of claim 8, wherein said interesting frames are identified based on one or more objects represented in said interesting frames.

10. The computer-implemented method of claim 9, wherein said objects are identified based on audience demographics of said full length video.

11. The computer-implemented method of claim 9, wherein said engaging formats include one or more of a challenge, a quiz, or a puzzle.

12. The computer-implemented method of claim 11, wherein said one or more of said challenge, said quiz, and said puzzle include interactivity corresponding to said one or more objects represented in said interesting frames.

13. The computer-implemented method of claim 8, wherein said results are used to retarget advertising.

14. The computer-implemented method of claim 8, further comprising:
   performing audio translation of the extracted audio information to text, wherein said interesting frames are identified based on said text from said audio translation.

15. A non-transitory storage medium having stored thereon a computer program comprising a program code to perform a method for increasing user engagement with video advertisements and content by summarization, the method comprising:
   receiving a video presentation;
   extracting audio information from said video presentation;

identifying interesting frames of said video presentation;
grouping said interesting frames;
determining when validation is necessary using any of frame and audio information, the determining including:
when validation is not necessary, non-validation format selection and placement is performed, the format is placed into a playback of a full length video, user information is collected from a viewer of the full length video, wherein the full length video is shown to the viewer with or without engaging formats, and results are generated; and
when validation is necessary, the format is placed into a playback of the full length video, user interaction information is collected, and determining when the engagement is successful;
when engagement is successful, video for an ad is ended and results are provided for analysis; and
when engagement is not successful, the full length video is shown with or without engaging formats and results are provided for analysis.

16. The non-transitory storage medium of claim 15, wherein said interesting frames are identified based on one or more objects represented in said interesting frames.

17. The non-transitory storage medium of claim 16, wherein said objects are identified based on audience demographics of said full length video.

18. The non-transitory storage medium of claim 16, wherein said engaging formats include one or more of a challenge, a quiz, or a puzzle.

19. The non-transitory storage medium of claim 18, wherein said one or more of said challenge, said quiz, and said puzzle include interactivity corresponding to said one or more objects represented in said interesting frames.

20. The non-transitory storage medium of claim 15, wherein said results are used to retarget advertising.

\* \* \* \* \*